US012065626B2

(12) United States Patent
Protzko et al.

(10) Patent No.: US 12,065,626 B2
(45) Date of Patent: *Aug. 20, 2024

(54) GALACTARATE BASED METAL SEQUESTRATION COMPOSITION

(71) Applicant: ZestBio, Inc., Berkeley, CA (US)

(72) Inventors: Ryan Protzko, Berkeley, CA (US); Luke Latimer, Hayward, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/085,406

(22) Filed: Dec. 20, 2022

(65) Prior Publication Data

US 2023/0295534 A1 Sep. 21, 2023

Related U.S. Application Data

(63) Continuation of application No. 17/006,416, filed on Aug. 28, 2020, now Pat. No. 11,560,529.

(Continued)

(51) Int. Cl.

| | |
|---|---|
| ***C11D 7/04*** | (2006.01) |
| ***C11D 1/08*** | (2006.01) |
| ***C11D 3/00*** | (2006.01) |
| ***C11D 3/04*** | (2006.01) |
| ***C11D 3/14*** | (2006.01) |
| ***C11D 3/395*** | (2006.01) |
| ***C11D 7/06*** | (2006.01) |

(Continued)

(52) U.S. Cl.

CPC .............. *C11D 1/08* (2013.01); *C11D 3/0047* (2013.01); *C11D 3/046* (2013.01); *C11D 3/14* (2013.01); *C11D 3/395* (2013.01); *C11D 7/06* (2013.01); *C11D 7/10* (2013.01); *C11D 7/12* (2013.01); *C11D 7/268* (2013.01)

(58) Field of Classification Search

CPC .... C11D 7/06; C11D 7/10; C11D 7/12; C11D 7/268

USPC .......................................... 510/470, 508, 509

See application file for complete search history.

(56) References Cited

U.S. PATENT DOCUMENTS 4,000,083 A 12/1976 Heesen
4,526,698 A 7/1985 Kuroda et al.

(Continued)

FOREIGN PATENT DOCUMENTS

EP 0700987 B1 3/2001
EP 2952569 A1 12/2015

(Continued)

OTHER PUBLICATIONS

Dijkgraaf, P.J.M.; Verkuylen, M.E.C.G.; Van Der Weile, K, "Complexation of calcium ions by complexes of glutamic acid and boric acid", Carbohydrate Research, Published: Jan. 1, 1987, DOI: 10.1016/0008-6215(87)80172-6.

(Continued)

*Primary Examiner* — Gregory R Delcotto
(74) *Attorney, Agent, or Firm* — Alpine Patents LLC; Brian Van Osdol

(57) ABSTRACT

A system and method for a metal sequestration composition comprising combining a galactaric salt or galactaric acid with a metalloid oxyanion, and an alkali compound. The system and method enable the production of a metal sequestration composition that either alone or in combination with other functional components (e.g., surfactants, solvents, pH modifiers) provide water treatment or cleaning compositions.

37 Claims, 2 Drawing Sheets

Galactarate

Galactaric Acid

Related U.S. Application Data

(60) Provisional application No. 62/893,029, filed on Aug. 28, 2019, provisional application No. 62/992,507, filed on Mar. 20, 2020.

(51) Int. Cl.

| | |
|---|---|
| ***C11D 7/10*** | (2006.01) |
| ***C11D 7/12*** | (2006.01) |
| ***C11D 7/26*** | (2006.01) |

(56) References Cited

U.S. PATENT DOCUMENTS

| | | | | |
|---|---|---|---|---|
| 8,562,736 | B2 | 10/2013 | Gill | |
| 9,023,780 | B2 | 5/2015 | Miralles | |
| 9,347,024 | B2 | 5/2016 | Smith et al. | |
| 11,560,529 | B2 * | 1/2023 | Protzko | C11D 7/10 |
| 2011/0312871 | A1 | 12/2011 | Miralles et al. | |
| 2012/0119152 | A1 | 5/2012 | Smith et al. | |
| 2012/0258903 | A1 | 10/2012 | Bjelopavlic et al. | |
| 2012/0277141 | A1 | 11/2012 | Smith et al. | |
| 2012/0295986 | A1 | 11/2012 | Smith et al. | |
| 2013/0123164 | A1 | 5/2013 | Jones et al. | |
| 2016/0002576 | A1 | 1/2016 | Jones et al. | |
| 2016/0102274 | A1 | 4/2016 | Smith et al. | |
| 2017/0240899 | A1 | 8/2017 | Wu et al. | |
| 2018/0334640 | A1 | 11/2018 | Bartelme et al. | |

FOREIGN PATENT DOCUMENTS

| | | | |
|---|---|---|---|
| WO | 9858045 | A1 | 12/1998 |
| WO | 2013181150 | A1 | 12/2013 |
| WO | 2016192787 | A1 | 12/2016 |

OTHER PUBLICATIONS

E. Ferrari, M. Salandini, Iron(III) complexing ability of carbohydrate derivatives, Department of Chemistry, University of Modena and Reggio Emilia, Modena, Italy, Journal of Inorganic Biochemistry, www.sciencedirect.com, Mar. 18, 2004.

Monica Saladini, Ledi Menabue, Erika Ferrari, "Sugar complexes with metal + ions: thermodynamic parameters of associations of Ca2+, Mg2+ and Zn2+ with galactaric acid", Carbohydrate Research, Department of Chemistry, University of Modena and Reggio Emilia, Modena, Italy, www.elsevier.com/locate/carres.

Wilham C. A. et al., "Organic acids as builders in linear alkybenzene sulfonate detergent formulations", Journal of the American Oil Chemists Society, 1971, vol. 48, issue 11. pp. 682-683; retrieved from the Internet: < DOI: 10: 1007/bf02638518 >; see entire document, especially, p. 682.

* cited by examiner

Galactarate

Galactaric Acid

GALACTARATE BASED METAL SEQUESTRATION COMPOSITION

CROSS-REFERENCE TO RELATED APPLICATIONS

This Application is a Continuation Application of U.S. patent application Ser. No. 17/006,416, filed on 28 Aug. 2020, which claims the benefit of U.S. Provisional Application No. 62/893,029, filed on 28 Aug. 2019, and U.S. Provisional Application No. 62/992,507, filed on 20 Mar. 2020, all of which are incorporated in their entireties by this reference.

TECHNICAL FIELD

This invention relates generally to the field of metal sequestration, and more specifically to a new and useful system and method for creating a galactarate based metal sequestration composition.

BACKGROUND

Conventional detergents and corrosion inhibitors are used in the vehicle care, food and beverage (e.g., the dairy, cheese, sugar, meat, food, and brewery and other beverage industries), warewashing, and laundry industries include alkaline detergents. Detergents, particularly those intended for institutional and commercial use, generally contain phosphates, nitrilotriacetic acid (NTA) and ethylenediaminetetraacetic acid (EDTA). Phosphates, NTA and EDTA are components commonly used in detergents to remove soils and to sequester metal ions such as calcium, magnesium and iron.

In particular, NTA, EDTA or polyphosphates such as sodium tripolyphosphate, and their salts, are used in detergents because of their ability to solubilize preexisting inorganic salts and/or soils. When calcium, magnesium and iron salts precipitate, the crystals may attach to the surface being cleaned and cause undesirable effects. For example, calcium carbonate precipitation on the surface of ware can negatively impact the aesthetic appearance of the ware, giving an unclean look. In the field of laundry washing, if calcium carbonate precipitates and attaches onto the surface of fabric, the crystals may leave the fabric feeling hard and rough to the touch. In the food and beverage industry, the calcium carbonate residue can affect the acidity levels of foods. The ability of NTA, EDTA and polyphosphates to remove metal ions facilitates the detergency of the solution by preventing hardness precipitation, assisting in soil removal and/or preventing soil redeposition into the wash solution or wash water.

One application in which metal sequestering agents are useful is in detergent formulations. Detergents are cleaning mixtures composed primarily of surfactants, builders, bleaching-agents, enzymes, and fillers. Two of the major components are surfactants and builders. The surfactants are responsible for emulsification of oil and grease while builders are added to extend or improve the cleaning properties of the surfactant. The builder can be a single substance or a mixture of substances and commonly serve multiple functions. An important builder function is the sequestration of metal cations, typically calcium and magnesium cations in hard water. The builders act as water softening agents by sequestering calcium and magnesium cations and preventing the formation of water insoluble salts between cations and anion components in the wash solution, such as surfactants and calcium ions. In the case of laundry detergents, builders also help prevent the cations from binding to cotton, a major cause of soil retention on cotton fabrics. Other functions of builders include increasing alkalinity of detergent solutions, deflocculating surfactant micelles, and inhibiting corrosion.

While effective, phosphates and NTA are subject to government regulations due to environmental and health concerns. Although EDTA is not currently regulated, it is believed that government regulations may be implemented due to environmental persistence.

Therefore, there is a need in the art for an alternative, and preferably environmentally friendly, cleaning composition that can replace the properties of phosphorous-containing compounds such as phosphates, phosphonates, phosphites, and acrylic phosphinate polymers, as well as non-biodegradable aminocarboxylates such as NTA and EDTA.

DESCRIPTION OF THE EMBODIMENTS

Figure 1:
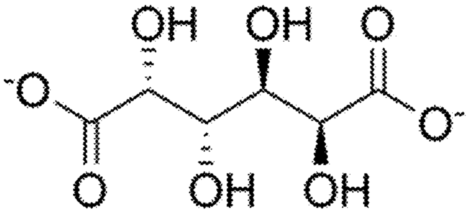
FIG. 1 is diagram of the chemical structures of galactaric acid and galactarate.
Figure 1:
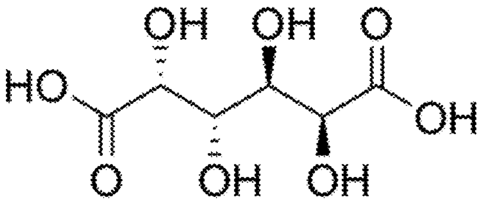

The following description of the embodiments of the invention is not intended to limit the invention to these embodiments but rather to enable a person skilled in the art to make and use this invention.

1. Overview

A system and method for creating a metal sequestration composition comprising a galactarate salt or galactaric acid with a metalloid oxyanion. The system and method enable the production of a metal sequestration composition that either alone or in combination with other functional components (e.g., surfactants, solvents, pH modifiers) provide a cleaning composition. Metal sequestering agents can be referred to as chelants or chelating agents. Chelating agents are chemicals that form soluble, complex molecules with certain metal ions, inactivating the ions so that they cannot normally react with other elements or ions. Chelants bind with metal ions or metallic compounds, preventing them from adhering to a surface (such as skin, metal or plastic surfaces, or clothing) or causing contamination, such as in the case of trace amounts of iron. The metalloid oxyanions may include any range of the metalloid oxyanions, but in one variation can include aluminate and borate oxyanions and their salts. In some preferred variations the sequestration agent further includes an alkali compound, wherein the alkali compound may further improve the effectiveness of the composition, improve the composition stability, and/or improve composition solubility. Examples of alkali compounds include, but are not limited to, metal hydroxide solutions or non-metal hydroxide solutions. Metal hydroxides include, but are not limited to: calcium hydroxide ($Ca(OH)2$), sodium hydroxide (NaOH), potassium hydroxide (KOH), rubidium hydroxide (RbOH), and caesium hydroxide (CsOH). Non-metalhydroxides include, but are not limited to: ammonium hydroxide and sodium carbonate.

These cleaning compositions may have a broad range of applicability, and may include: soaps, body cleansers and chelants, rust removal compositions, cleaning detergents, etc. In some cases, the novel composition is used as a descaling agent or chemical descaler. A descaling agent or chemical descaler is a chemical substance used to remove limescale from metal surfaces in contact with hot water, such as in boilers, water heaters, and kettles. Limescale is a hard, chalky deposit, consisting mainly of calcium carbonate (CaCO3), that often builds up inside kettles, hot water boilers, and pipework, especially that for hot water. It is also often found as a similar deposit on the inner surfaces of old pipes and other surfaces where "hard water" has evaporated.

Rust (particularly iron rust) occurs in various environments of machines, facilities etc. in contact with water, and deteriorates the performance of the machines and facilities, and thus there is a need for removal of the rust. Accordingly, various methods of removing rust have been proposed. For example, an acid cleaning method, an alkali cleaning method (chelate cleaning method), an electrolytic cleaning method etc. are known as conventional methods of removing rust. In some applications, the metal sequestering compositions can be used for removing rust.

Metal sequestering agents can be used in personal care in the form of creams and lotions, body washes, shampoos, conditioners, cosmetics and skin care products. Metal sequestering agents, aka chelators, are shown to improve the efficacy of preservatives and antioxidants and play a crucial role in the stability and efficacy of personal skin care products, thereby improving consumer acceptance. In addition, they have demonstrated the ability to boost preservative activity. Metal sequestering agents are used in liquid soap and body wash to prevent fragrance and color degradation and for their synergistic effect with antimicrobials. They are also incorporated into bar soap to prevent rancidity, softening, brown-spotting, cracking and discoloration due to metal ions, as well as to enhance foaming and rinse-ability. Personal care products that may contain metal sequestering agents includes, but is not limited to, colognes, deodorant, eye liner, lip gloss, lipstick, lip balm, lotion, makeup, hand soap, facial cleanser, body wash, pomade, perfumes, shaving cream, moisturizer, toothpaste, facial treatments, wet wipes, and shampoo.

In some applications, the system and method can enable a biodegradable metal sequestering composition. The biodegradable formulation of the system and method can be used to chelate a heavy metal. Heavy metals include, but are not limited to, iron, copper, zinc, manganese, chromium, lead, mercury, aluminum, nickel, and cobalt.

As a descaling agent, the sequestration composition may enable the removal of calcium and other deposits from metal, ceramics, and glass. The sequestration composition may be particularly useful for water treatment. As a water treatment agent (e.g., boiler treatment or cooler treatment), the sequestration composition may prevent or reduce rust and other metal deposits in a water container (e.g., water heater).

In some cases, the system and method may improve functionality of bleaching agents. Bleaching agents are typically highly reactive and bleach activity may decrease rapidly, particularly with exposure to air. Metal sequestration agents may be combined with bleaching agents to stabilize the bleaching agent, thereby improving and extending the life of the bleaching agent. For example, as part of a chlorine liquid bleach for direct purchase by consumers, the sequestration agent may bind metals preventing the bleach from reacting, thereby increasing the bleach shelf life. As part of a peroxide bleach for paper production, the sequestration may improve the effectiveness of the bleach for pulp and paper processing.

The system and method may provide a number of potential benefits. The system and method are not limited to always providing such benefits, and are presented only as exemplary representations for how the system and method may be put to use. The list of benefits is not intended to be exhaustive and other benefits may additionally or alternatively exist.

Unlike most metal sequestering compositions currently known in the art, the compositions of the present invention do not require that phosphorous, nitrilotriacetic acid (NTA) or ethylenediaminetetraacetic acid (EDTA) be present in order to be effective. Thus, the metal sequestering compositions may be biodegradable and substantially free of phosphorous and aminocarboxylates such as NTA and EDTA, making the metal sequestering compositions particularly useful in cleaning, water treatment and anti-corrosion applications where it is desired to use an environmentally friendly composition.

Galactarate has a high iron dispersion, which is much higher than other typical chemicals implemented. This may provide the benefit of making galactarate compositions very effective for certain applications, particularly rust inhibition and removal.

Boro-galactarate demonstrates nearly uniform binding of calcium over a broad spectrum of composition ranges. As calcium removal is a relatively common residue "soiling compound", the system and method may provide a wide range of beneficial applications based on calcium removal.

2. System

This invention describes metal sequestration compositions including a galactarate compound and an oxyanion. Galactarate compounds, i.e., galactaric acid and its salts, may have favorable metal sequestering properties. Galactaric acid and its salts (i.e., galactarate salts) may thus be prepared as compositions for metal sequestering applications. These compositions, including galactaric acid and/or galactarate salts, exhibit detergency, soil suspension, and anti-redeposition properties, and may thus be employed in compounds, in any desirable environment, to remove soils and to prevent the precipitation of magnesium, calcium, iron, and other metal ions. Other metal ions may be sequestered by such a composition, including copper, zinc, manganese, chromium, lead, mercury, copper, aluminum, nickel, zinc, and cobalt. In some variations, the composition may further include an alkali source. The alkali source may further improve the effectiveness of the composition, improve the composition stability, and/or reduce potential health risks of the composition.

Galactaric acid is a six-carbon dicarboxylic sugar acid containing four hydroxyls. In the open chain form, galactaric acid and its respective galactarate salts are optically inactive meso-compounds of a set of stereoisomers of at least two of which are optically active. Structures of the open chain form of galactaric acid and galactarate are shown in FIG. 1. Galactaric acid and its salts may undergo conformational changes, such as lactonization. Galactaric acid and its salts can be prepared by oxidation of carbohydrates, including galactose, galacturonic acid, and galactitol.

The galactaric acid and/or galactarate salts may be derived from plant biomass. In some cases, this plant biomass is pectin. Pectin is a structural acidic heteropolysaccharide contained in the primary cell walls of terrestrial plants. The main component of pectin is galacturonic acid, a sugar acid. Galacturonic acid, from pectin, may be converted to galactaric acid or galactarate salts by oxidation. Oxidation may be performed by chemical oxidation. Chemical oxidation can include nitric acid oxidation. Alternatively, galactaric acid or galactarate salts may be derived from galacturonic acid by aqueous catalytic oxidation using supported gold catalysts and molecular oxygen or air as the oxidant. Oxidation can be performed by biological oxidation. For example, microbial cells expressing a dehydrogenase, may convert galacturonic acid to galactaric acid or galactarate salts. In some cases, microbial cells express uronate dehydrogenase.

To characterize the solubility of sodium galactarate, 0.5M solutions of alkali salts and non-alkali base were prepared in deionized water. To 50 mL of each solution 0.5 g of sodium galactarate, was added at 20° C. with stirring. After 15 minutes and 50 minutes of stirring, solubility was qualitatively observed. As shown in Table 1 below, sodium galactarate was soluble in water-based solutions and under basic conditions. Surprisingly, the existing presence of lithium ions accelerated dissolution of sodium galactarate while the presence of sodium ions in solution, for example from sodium chloride or sodium hydroxide, inhibited the dissolution of sodium galactarate.

TABLE 1

Solubility of sodium galactarate in water-based solutions at 20° C.

| Solution (0.5 M) | Solubility after 15 min. | Solubility after 50 min. |
|---|---|---|
| Water | − | + |
| NaOH | − | − |
| NaCl | − | − |
| LiCl | + | + |
| $NH_4OH$ (pH 10) | − | + |

In a second embodiment of the system, the galactarate compound may be substituted by a tartaric compound, wherein the tartaric compound comprises tartaric acid and/or its salts. As a second embodiment of the system, all teachings of the galactarate compound may be replaced by the tartaric compound wherein the tartaric concentration is a molar equivalent to the galactaric compound. In a system where the galactarate compound is galactaric acid, the substitution with tartaric acid may be determined as 71.4% weight ratio of the mentioned galactarate compound percentage. Tartaric acid is an alpha-hydroxydicarboxylic acid, and is a hydroxyl derivative of succinic acid. Tartaric acid may refer to naturally occurring tartaric acid, (2R,3R)-tartaric acid, stereoisomers (e.g., (2S,3S)-tartaric acid, (2R, 3S)-tartaric acid, (2S,3R)-tartaric acid), and stereoisomer mixtures (e.g., racemic tartaric acid)

Galactaric acid may have poor solubility in water and under acidic conditions. Thus, some variations of the system may enable, or improve, solubility in water for any metal sequestering application. In one variation, galactaric acid solids may be mixed with an alkali source to yield a mixture that will dissolve in water. A suitable concentration for these components may be between approximately 25% and approximately 95%, by weight, galactaric acid and between approximately 5% and approximately 75%, by weight, of alkali solution. Examples of alkali solutions include, but are not limited to, metal hydroxide solutions or non-metal hydroxide solutions. Metal hydroxides include, but are not limited to: calcium hydroxide (Ca(OH)2), sodium hydroxide (NaOH), potassium hydroxide (KOH), rubidium hydroxide (RbOH), and caesium hydroxide (CsOH). Non-metal hydroxides include, but are not limited to: ammonium hydroxide and sodium carbonate.

In some variations, it may be advantageous to include a galactarate salt that includes an alkali compound without implementation of a separate alkali source. The galactarate salt with an alkali compound may function to improve stability, increase the active fraction of the mixture, and lower product health risk. An efficient route has been developed for production of galactarate salts from galactaric acid. The galactarate salt with an alkali compound may be produced by reacting free galactaric acid with an alkali solution containing the appropriate alkali metal salt (Li, Na, K, Rb, Cs) of the desired galactarate. In some cases, the alkali solution contains a dissolved oxyanion salt.

Galactarate combined with an oxyanion, e.g., an aluminum galactarate, borogalactarate, silico galactarate, may act as a metal binding agent. In some cases, the galactarate oxyanion salt may act as a builder in a detergent. Detergent compositions including an oxyanion galactarate may exhibit detergency, soil suspension and anti-redeposition properties. Generally speaking, galactarate may be combined with any metalloid oxyanion. Examples of metalloid oxyanions include: borate, silicate, germanate, arsenate, antimonate, tellurate, carbanion, aluminate, and selenate.

The composition may be a liquid and/or solid detergent composition. When the composition is provided as a liquid, the present invention may include a gel or paste. When the composition is provided as a solid, the detergent composition may take forms including, but not limited to: a cast, extruded molded or formed solid pellet, block, tablet, powder, granule, flake, etc.

The metal sequestering composition described herein may generally include a galactaric acid, a galactaric acid salt (referred herein as galactarate salt), and/or any desired combinations of galactaric acid and/or galactaric acid salts. In some variations, the composition may include a galactaric acid or a galactarate salt of the galactaric acid in combination with an oxyanion. In some variations, a detergent composition may include a galactaric acid or a galactarate salt in combination with an alkalinity source. In some variations, the metal sequestering composition may include galactaric acid or a galactaric acid salt in combination with an oxyanion, an alkalinity source and a surfactant or surfactant system.

The present invention relates to a metal-sequestering composition including galactaric acid or its salts. In one variation, the metal sequestering composition includes 100% galactaric acid. In another variation, the present invention is a metal sequestering composition including between about 0.01% and about 99.99% galactaric acid. In a third variation, the metal sequestering composition comprises 100% galactarate salt. In another variation, the metal sequestering composition including between about 0.01% and about 99.99% galactarate salt. In some examples, the galactarate salt is selected from a list consisting of aluminum galactarate, borogalactarate, sodium galactarate, potassium galactarate, sodium potassium galactarate, and ferrous galactarate. In examples, the galactaric acid or galactarate salt is formulated with other ingredients, including, but not limited to, 0.01% and about 99.99% of metal hydroxide, such as sodium hydroxide.

In variations where the composition includes an oxyanion, a suitable concentration range of the components in the metal sequestering compositions may include between approximately 1% and approximately 99% by weight galactarate salt or galactaric acid and between approximately 1% and approximately 99% by weight oxyanion.

In some variations, the metal sequestering composition may further comprise other functional materials. These functional materials may provide desired properties and functionalities to the metal sequestering compositions. For the purpose of this application, the term "functional material" includes a material that when dispersed or dissolved in a use and/or concentrate solution (e.g., an aqueous solution), provides a beneficial property for a particular use case. Examples of functional materials include, but are not limited to: organic detergents; cleaning agents; rinse aids; bleaching agents; sanitizers/anti-microbial agents; activators; detergent builders or fillers; defoaming agents, anti-redeposition agents; optical brighteners; dyes/odorants; secondary hardening agents/solubility modifiers; pesticides for pest control applications; or the like, or a broad variety of other functional materials, depending upon the desired characteristics and/or functionality of the composition. The composition may additionally include a threshold system, as disclosed in U.S. application Ser. No. 12/692,352 "High Alkaline Detergent Composition With Enhanced Scale Control," which is incorporated herein by reference.

Additional examples of functional materials are discussed in more detail below, but it should be understood by those of skill in the art and others that the particular materials discussed are given by way of example only, and that a broad variety of other functional materials may be used. For example, many of the functional materials discussed below relate to materials used in cleaning and/or destaining applications, but it should be understood that other embodiments may include functional materials for use in other applications, particularly in use with a detergent composition.

In some variations, wherein the system functions as, or part of, a detergent composition, the composition may include one or more of detergent fillers. The detergent filler may not necessarily perform as a cleaning agent per se, but may enhance the overall cleaning capacity of the composition. Examples of suitable fillers include, but are not limited to: sodium sulfate, sodium chloride, starch, sugars, and C1-C10 alkylene glycols such as propylene glycol.

The detergent composition variations may include a minor but effective amount of a hardening agent. Hardening agents may vary the solubility of the composition in an aqueous medium during use such that the cleaning agent and/or other active ingredients may be dispensed from the solid composition over an extended period of time. Examples of suitable hardening agents include, but are not limited to: an amide such stearic monoethanolamide or lauric diethanolamide, an alkylamide, a solid polyethylene glycol, a solid EO/PO block copolymer, starches that have been made water-soluble through an acid or alkaline treatment process, and various inorganics that impart solidifying properties to a heated composition upon cooling.

The detergent compositions may include a metal corrosion inhibitor in an amount up to approximately 30% by weight. In some variations, the metal corrosion inhibitor may comprise a lesser amount. For example, in one implementation the metal corrosion inhibitor comprises 2%, by weight, of the composition and in another implementation, the metal corrosion inhibitor comprises 6%, by weight, of the composition. The exact amount of corrosion inhibitor may vary per implementation. Preferably, the corrosion inhibitor is included in the detergent composition in an amount sufficient to provide a solution that exhibits a rate of corrosion and/or etching of glass that is less than the rate of corrosion and/or etching of glass for an otherwise identical use solution without the corrosion inhibitor. Examples of suitable corrosion inhibitors include, but are not limited to: a combination of a source of aluminum ion and a source of zinc ion, as well as an alkaline metal silicate or hydrate thereof.

The corrosion inhibitor may refer to the combination of a source of aluminum ion boron ion, and/or zinc ion. The source of aluminum ion, boron ion, and/or zinc ion may provide aluminum ion, boron ion and/or zinc ion, respectively, when the solid detergent composition is provided in the form of a use solution. The amount of the corrosion inhibitor may be calculated based upon the combined amount of the source of aluminum ion, source of the boron ion, and the source of zinc ion. It is not necessary for the source of aluminum ion, boron ion, and/or zinc ion to react to form the aluminum, boron, and/or zinc ion. The source of aluminum, boron, and/or zinc ion may be provided as organic salts, inorganic salts, and mixtures thereof. Exemplary sources of aluminum ion include, but are not limited to: aluminum salts such as sodium aluminate, aluminum bromide, aluminum chlorate, aluminum chloride, aluminum iodide, aluminum nitrate, aluminum sulfate, aluminum acetate, aluminum formate, aluminum tartrate, aluminum lactate, aluminum oleate, aluminum bromate, aluminum borate, aluminum potassium sulfate, aluminum zinc sulfate, and aluminum phosphate. Exemplary sources of boron ion are sodium borate and potassium borate. Exemplary sources of zinc ion include, but are not limited to: zinc salts such as zinc chloride, zinc sulfate, zinc nitrate, zinc iodide, zinc thiocyanate, zinc fluorosilicate, zinc dichromate, zinc chlorate, sodium zincate, zinc gluconate, zinc acetate, zinc benzoate, zinc citrate, zinc lactate, zinc formate, zinc bromate, zinc bromide, zinc fluoride, zinc fluorosilicate, and zinc salicylate. Other sources for aluminum, boron, and zinc salts may be used as desired.

By controlling the ratio of the aluminum and boron (referred to as aluminum/boron) to the zinc ion in the use solution, it is possible to provide reduced corrosion and/or etching of glassware and ceramics compared with the use of either component alone. That is, the combination of the aluminum/boron ion and the zinc ion may provide a synergy in the reduction of corrosion and/or etching. The ratio of the source of aluminum/boron ion to the source of zinc ion can be controlled to provide a synergistic effect. In general, the weight ratio of aluminum/boron ion to zinc ion in the use solution may be between at least approximately 6:1, can be less than approximately 1:20, and can be between approximately 2:1 and approximately 1:15.

In some variations, the composition may include an alkaline metal silicate, or a hydrate thereof. The alkaline metal silicate, or hydrate thereof, may function to enable the formation of a stable solid detergent composition having metal protecting capacity. The alkali silicates employed in the composition may include: alkali metal silicates that are powdered, particulate or granular silicates which are either anhydrous, or preferably contain water of hydration (e.g., approximately 5% to approximately 25% by weight). In some preferred variations, the silicates are sodium silicates and have a Na2O:SiO2 ratio of approximately 1:1 to approximately 1:5. The sodium silicates may contain water in the from approximately 5% to approximately 25% by weight. In some preferred variations, the sodium silicates have a Na2O:SiO2 ratio of approximately 1:1 to approximately 1:3.75. In one example the sodium silicates have a Na2O:SiO2 ratio approximately 1:1.5 to approximately 1:3.75. In another example the sodium silicates have a Na2O:SiO2 ratio approximately 1:1.5 to approximately 1:2.5. In one preferred implementation the sodium silicate may have a Na2O:SiO2 ratio of approximately 1:2 and approximately 16% to approximately 22% by weight water of hydration. Silicates may be available in powder form as GD Silicate and in granular form as Britesil H-20, available from PQ Corporation, Valley Forge, Pa. Sodium silicates ratios may be obtained with single silicate compositions or combinations of silicates which upon combination result in the preferred ratio. The hydrated sodium silicates at preferred ratios, a Na2O:SiO2 ratio of approximately 1:1.5 to approximately 1:2.5, have been found to provide the optimum metal protection and rapidly form a solid detergent. Hydrated sodium silicates are preferred.

In some variations, the composition may include silicates. Silicates may function to provide metal protection, but are additionally known to provide alkalinity and additionally function as anti-redeposition agents. Exemplary silicates include, but are not limited to: sodium silicate and potassium silicate. The silicate concentration may be dependent on the implementation and the desired amount of metal protection.

The silicate concentration may comprise of at least approximately 1% by weight, to at least approximately 35%, by weight. In one example the silicate concentration is approximately 10% by weight. In a second example, the silicate concentration is approximately 15% by weight. In another example, the silicate concentration is approximately 20%, by weight. In another example, the silicate concentration is approximately 25%, by weight. In another example, the silicate concentration is approximately 30%, by weight. The silicate concentration may be limited by the concentration of components within the composition. Thus, in alternative variations, the silicate concentration may be greater than 35%, by weight.

In some variations, the composition may include bleaching agents. As part of the sequestering composition bleaching agents may function as more effective bleaching agents. In these variations, metal sequestration may play a role in stabilizing the bleaching agent. Examples of bleaching agents include chlorine, sodium hypochlorite, and peroxide. The bleaching agent may comprise approximately 1-30% (wt/vol) of an aqueous solution and the sequestering composition comprising approximately 0.1-10% of the same solution.

Example 1

In a first example, a metal sequestration first composition includes: a galactarate compound selected from a group consisting of a galactaric acid and a galactarate salt compound; an aluminum oxyanion; and an alkali source compound. The galactaric compound may comprise approximately 35%-95%, by weight, of the first composition; the aluminum oxyanion may comprise approximately 5%-50%, by weight, of the first composition; and the alkali source compound may comprise approximately 0%-40%, by weight, of the first composition. The first composition may function as a corrosion inhibitor, may be used to remove soils, and/or prevent the precipitation of metals (e.g., magnesium, calcium, iron, copper, manganese, etc.). The first composition may function as a distinct compound or as part of another solution (e.g., detergent or bleach), wherein the first composition provides functional properties to the solution.

In some variations of the first composition, the aluminum oxyanion is selected from a group consisting of an aluminum salt or its conjugate acid. Examples of the aluminum salt include: sodium aluminate and aluminum chloride. In some variations the alkali source compound is selected from a group consisting of a hydroxide salt. Examples of the hydroxide salts include: calcium hydroxide, sodium hydroxide, potassium hydroxide, rubidium hydroxide, caesium hydroxide, and ammonium hydroxide.

In a first variation of the first composition, wherein the selected galactarate compound comprises sodium galactarate and the selected aluminum oxyanion comprises sodium aluminate, the galactaric compound comprises 50%-95%, by weight, of the first composition; and the aluminum oxyanion comprises 5-50%, by weight, of the composition.

In one implementation of the first variation, the galactaric compound comprises approximately 50%-60%, by weight, of the first composition and the aluminum oxyanion comprises approximately 40%-50%, by weight, of the first composition.

In one implementation of the first variation, the galactaric compound comprises approximately 55%-65%, by weight, of the first composition and the aluminum oxyanion comprises approximately 35%-45%, by weight, of the first composition.

In one implementation of the first variation, wherein the galactaric compound comprises approximately 65%-75%, by weight, of the first composition and the aluminum oxyanion comprises approximately 25%-35%, by weight, of the first composition.

In one implementation of the first variation, the galactaric compound comprises approximately 75%-85%, by weight, of the first composition and the aluminum oxyanion comprises approximately 15%-25%, by weight, of the first composition.

In one implementation of the first variation, the galactaric compound comprises approximately 85%-95%, by weight, of the first composition and the aluminum oxyanion comprises approximately 5%-15%, by weight, of the first composition.

In a second variation of the first composition, wherein the selected galactarate compound comprises galactaric acid, the selected aluminum oxyanion comprises sodium aluminate, and the selected alkali source compound comprises sodium hydroxide; the galactaric compound comprises approximately 35%-70%, by weight, of the first composition, the aluminum oxyanion comprises 5%-40%, by weight, of the first composition, and the alkali source compound comprises 15%-35%, by weight, of the first composition. The second variation of the first composition may have distinct solubility properties, wherein the second variation may more readily dissolve in water at higher concentrations. Additionally, the second variation may have a higher pH as compared to the first variation.

In one implementation of the second variation, the galactaric compound comprises approximately 60%-70%, by weight, of the first composition and the aluminum oxyanion comprises approximately 20%-30%, by weight, of the first composition, and the alkali source compound comprises 15%-20%, by weight, of the first composition.

In one implementation of the second variation, the galactaric compound comprises approximately 60%-70%, by weight, of the first composition and the aluminum oxyanion comprises approximately 10%-20%, by weight, of the first composition, and the alkali source compound comprises 20%-30%, by weight, of the first composition.

In one implementation of the second variation, the galactaric compound comprises approximately 60%-70%, by weight, of the first composition and the aluminum oxyanion comprises approximately 10%-20%, by weight, of the first composition, and the alkali source compound comprises 15%-20%, by weight, of the first composition.

In one implementation of the second variation, the galactaric compound comprises approximately 60%-70%, by weight, of the first composition and the aluminum oxyanion comprises approximately 5%-15%, by weight, of the first composition, and the alkali source compound comprises 25%-35%, by weight, of the first composition.

In one implementation of the second variation, the galactaric compound comprises approximately 60%-70%, by weight, of the first composition and the aluminum oxyanion comprises approximately 5%-15%, by weight, of the first composition, and the alkali source comprises 15%-25%, by weight, of the first composition.

In one implementation of the second variation, the galactaric compound comprises approximately 50%-60%, by weight, of the first composition and the aluminum oxyanion comprises approximately 30%-40%, by weight, of the first composition, and the alkali source comprises 15%-20%, by weight, of the first composition.

In one implementation of the second variation, the galactaric compound comprises approximately 50%-60%, by weight, of the first composition and the aluminum oxyanion comprises approximately 20%-30%, by weight, of the first composition, and the alkali source comprises 20%-30%, by weight, of the first composition.

In one implementation of the second variation, the galactaric compound comprises approximately 50%-60%, by weight, of the first composition and the aluminum oxyanion comprises approximately 20%-30%, by weight, of the first composition, and the alkali source comprises 15%-25%, by weight, of the first composition.

In one implementation of the second variation, the galactaric compound comprises approximately 50%-60%, by weight, of the first composition and the aluminum oxyanion comprises approximately 15%-25%, by weight, of the first composition, and the alkali source comprises 25%-35%, by weight, of the first composition.

In one implementation of the second variation, the galactaric compound comprises approximately 40%-50%, by weight, of the first composition and the aluminum oxyanion comprises approximately 30%-40%, by weight, of the first composition, and the alkali source comprises 20%-30%, by weight, of the first composition.

In one implementation of the second variation, the galactaric compound comprises approximately 40%-50%, by weight, of the first composition and the aluminum oxyanion comprises approximately 30%-40%, by weight, of the first composition, and the alkali source comprises 15%-25%, by weight, of the first composition.

In one implementation of the second variation, the galactaric compound comprises approximately 40%-50%, by weight, of the first composition and the aluminum oxyanion comprises approximately 25%-35%, by weight, of the first composition, and the alkali source comprises 25%-35%, by weight, of the first composition.

In one implementation of the second variation, the galactaric compound comprises approximately 40%-50%, by weight, of the first composition and the aluminum oxyanion comprises approximately 25%-35%, by weight, of the first composition, and the alkali source comprises 15%-25%, by weight, of the first composition.

In one implementation of the second variation, the galactaric compound comprises approximately 35%-45%, by weight, of the first composition and the aluminum oxyanion comprises approximately 30%-40%, by weight, of the first composition, and the alkali source comprises 25%-35%, by weight, of the first composition.

Example 1

Herein is presented an example teaching of the second embodiment (i.e. replacing galactaric acid with tartaric acid) for the first example. Using an equimolar conversion between galactaric acid and tartaric acid (71.4% wt/wt), the first example, metal sequestration first composition may be converted for the tartaric acid implementation. Thus, for the second embodiment of the first example, a metal sequestration first composition includes: a tartaric compound selected from a group consisting of a tartaric acid and a galactarate salt compound; and aluminum oxyanion, and an alkali source compound. The tartaric compound may comprise approximately 40%-50%, by weight, of the first composition; the aluminum oxyanion may comprise approximately 25%-35%, by weight, of the first composition; and the alkali source compound may comprise approximately 25%-35%, by weight, of the first composition. As presented for part of the first example, the aforementioned equimolar conversion may be used to convert galactaric acid concentrations to tartaric acid concentrations for any desired implementation of the system.

Example 2

In a second example, a metal sequestration second composition includes: a galactarate compound selected from a group consisting of a galactaric acid and a galactarate salt compound; a borate oxyanion; and an alkali source compound. The galactaric compound may comprise approximately 25%-95%, by weight, of the second composition; the borate oxyanion may comprise approximately 5%-75%, by weight, of the second composition; and the alkali source compound may comprise approximately 0%-30%, by weight, of the second composition. The second composition may function as a corrosion inhibitor, may be used to remove soils, and/or prevent the precipitation of metals (e.g., magnesium, calcium, iron, copper, manganese, etc.). The second composition may function as a distinct compound or as part of another solution (e.g., detergent or bleach), wherein the second composition provides functional properties to the solution. The borate oxyanion in conjunction with the galactarate compound may function as an effective chelant.

In some variations of the composition, the borate oxyanion is selected from a group consisting of a borate salt and its conjugate acid. Examples of the borate salts include: sodium borate, borax, potassium borate, sodium perborate, magnesium borate, and zinc borate. In some variations the alkali source compound is selected from a group consisting of a hydroxide salt. Examples of the hydroxide salts include: calcium hydroxide, sodium hydroxide, potassium hydroxide, rubidium hydroxide, caesium hydroxide, and ammonium hydroxide.

In a first variation of the second composition, wherein the selected galactarate compound comprises sodium galactarate and the selected borate oxyanion comprises sodium borate, the galactaric compound comprises 30%-95%, by weight, of the second composition; and the borate oxyanion comprises 5-70%, by weight, of the second composition. Dependent on implementation the sodium borate may be sodium borate decahydrate. Alternatively, the sodium borate may anhydrous sodium borate.

In one implementation of the first variation, the galactaric compound comprises approximately 85%-95%, by weight, of the second composition and the borate oxyanion comprises approximately 5%-15%, by weight, of the second composition.

In one implementation of the first variation, the galactaric compound comprises approximately 75%-85%, by weight, of the second composition and the borate oxyanion comprises approximately 15%-25%, by weight, of the second composition.

In one implementation of the first variation, the galactaric compound comprises approximately 55%-65%, by weight, of the second composition and the borate oxyanion comprises approximately 25%-35%, by weight, of the second composition.

In one implementation of the first variation, the galactaric compound comprises approximately 45%-55%, by weight, of the second composition and the borate oxyanion comprises approximately 35%-45%, by weight, of the second composition.

In one implementation of the first variation, the galactaric compound comprises approximately 35%-45%, by weight, of the second composition and the borate oxyanion comprises approximately 45%-55%, by weight, of the second composition.

In one implementation of the first variation, the galactaric compound comprises approximately 30%-40%, by weight, of the second composition and the borate oxyanion comprises approximately 60%-70%, by weight, of the second composition.

In a second variation of the second composition, wherein the selected galactarate compound comprises galactaric acid, the selected borate oxyanion comprises sodium borate, and the selected alkali source comprises sodium hydroxide; the galactaric compound comprises approximately 25%-75%, by weight, of the second composition, the borate oxyanion comprises 5%-65%, by weight, of the second composition, and the alkali source comprises 10%-30%, by weight, of the second composition. The second variation of the second composition may have distinct solubility properties, wherein the second variation may more readily dissolve in water at higher concentrations. Additionally, the second variation may have a higher pH as compared to the first variation.

In one implementation of the second variation, the galactaric compound comprises approximately 65%-75%, by weight, of the second composition and the borate oxyanion comprises approximately 15%-25%, by weight, of the second composition, and the alkali source comprises 10%-20%, by weight, of the second composition.

In one implementation of the second variation, the galactaric compound comprises approximately 65%-75%, by weight, of the second composition and the borate oxyanion comprises approximately 5%-15%, by weight, of the second composition, and the alkali source comprises 20%-30%, by weight, of the second composition.

In one implementation of the second variation, the galactaric compound comprises approximately 65%-75%, by weight, of the second composition and the borate oxyanion comprises approximately 5%-15%, by weight, of the second composition, and the alkali source comprises 10%-20%, by weight, of the second composition.

In one implementation of the second variation, the galactaric compound comprises approximately 60%-70%, by weight, of the second composition and the borate oxyanion comprises approximately 20%-30%, by weight, of the second composition, and the alkali source comprises 10%-20%, by weight, of the second composition.

In one implementation of the second variation, the galactaric compound comprises approximately 60%-70%, by weight, of the second composition and the borate oxyanion comprises approximately 10%-20%, by weight, of the second composition, and the alkali source comprises 20%-30%, by weight, of the second composition.

In one implementation of the second variation, the galactaric compound comprises approximately 60%-70%, by weight, of the second composition and the borate oxyanion comprises approximately 10%-20%, by weight, of the second composition, and the alkali source comprises 10%-20%, by weight, of the second composition.

In one implementation of the second variation, the galactaric compound comprises approximately 60%-70%, by weight, of the second composition and the borate oxyanion comprises approximately 5%-15%, by weight, of the second composition, and the alkali source comprises 20%-30%, by weight, of the second composition.

In one implementation of the second variation, the galactaric compound comprises approximately 60%-70%, by weight, of the second composition and the borate oxyanion comprises approximately 5%-15%, by weight, of the second composition, and the alkali source comprises 15%-25%, by weight, of the second composition.

In one implementation of the second variation, the galactaric compound comprises approximately 50%-60%, by weight, of the second composition and the borate oxyanion comprises approximately 30%-40%, by weight, of the second composition, and the alkali source comprises 10%-20%, by weight, of the second composition.

In one implementation of the second variation, the galactaric compound comprises approximately 50%-60%, by weight, of the second composition and the borate oxyanion comprises approximately 20%-30%, by weight, of the second composition, and the alkali source comprises 20%-30%, by weight, of the second composition.

In one implementation of the second variation, the galactaric compound comprises approximately 50%-60%, by weight, of the second composition and the borate oxyanion comprises approximately 20%-30%, by weight, of the second composition, and the alkali source comprises 10%-20%, by weight, of the second composition.

In one implementation of the second variation, the galactaric compound comprises approximately 40%-50%, by weight, of the second composition and the borate oxyanion comprises approximately 40%-50%, by weight, of the second composition, and the alkali source comprises 10%-20%, by weight, of the second composition.

In one implementation of the second variation, the galactaric compound comprises approximately 40%-50%, by weight, of the second composition and the borate oxyanion comprises approximately 30%-40%, by weight, of the second composition, and the alkali source comprises 20%-30%, by weight, of the second composition.

In one implementation of the second variation, the galactaric compound comprises approximately 40%-50%, by weight, of the second composition and the borate oxyanion comprises approximately 30%-40%, by weight, of the second composition, and the alkali source comprises 10%-20%, by weight, of the second composition.

Example 3

In a third example, a metal sequestration third composition includes: a galactarate compound selected from a group consisting of a galactaric acid and a galactarate salt compound and an alkali source compound. The galactaric compound may comprise approximately 40%-80%, by weight, of the third composition and the alkali source compound may comprise approximately 20%-60%, by weight, of the third composition. The third composition may function as a corrosion inhibitor, to remove soils, and/or prevent the precipitation of metals (e.g., magnesium, calcium, iron, copper, manganese, etc.). The third composition may be particularly effective for iron and copper dispersion and manganese binding. The third composition may function as a distinct compound or as part of another solution (e.g., detergent or bleach), wherein the third composition provides functional properties to the solution.

In some variations of the third composition the alkali source compound is selected from a group consisting of sodium hydroxide, potassium hydroxide, sodium carbonate, and ammonium hydroxide.

In a first variation of the third composition, the selected galactarate compound comprises galactaric acid and the alkali source compound comprises sodium hydroxide. In a second variation of the third composition, the selected galactarate compound comprises galactaric acid and the alkali source compound comprises sodium carbonate.

In one implementation of the first or second variation, the galactaric compound comprises approximately 70%-80%, by weight, of the third composition and the alkali source compound comprises approximately 20%-30%, by weight, of the third composition.

In one implementation of the first variation or the second variation, the galactaric compound comprises approximately 60%-70%, by weight, of the third composition and the alkali source compound comprises approximately 30%-40%, by weight, of the third composition.

In one implementation of the first variation or the second variation, the galactaric compound comprises approximately 50%-60%, by weight, of the third composition and the alkali source compound comprises approximately 40%-50%, by weight, of the third composition.

In one implementation of the first variation or the second variation, the galactaric compound comprises approximately 40%-50%, by weight, of the third composition and the alkali source compound comprises approximately 50%-60%, by weight, of the third composition.

In many variations, the system composition may further include implementation components such that the metal sequestration composition comprises a key component to the use system. In one example, the use system is a dish detergent use system and in another system the use system is a hard surface cleaner.

Example 4—Dish Detergent

In a dish detergent use system, the metal sequestration composition of example 2 may be further implemented to leverage the composition to enable efficient warewashing (e.g., for dish washing). The dish detergent use system functions to enable cleaning of dishes in an automatic dishwasher and other types of warewashing.

In a first variation of a dish detergent use system, the system may include: a metal sequestration composition, comprising a galactarate compound that is comprised of sodium galactarate and an oxyanion. In one implementation, the oxyanion is comprised of a borate mix salt (e.g., sodium borate salt). In another implementation, the oxyanion is comprised of an aluminate mix salt (e.g., sodium aluminate salt). Additionally, the dish detergent use system may include: sodium carbonate, poloxamer 181, sodium metasilicate, sodium percarbonate, acusol 445, and sodium chloride. The metal sequestration composition may comprise approximately 10-40%, by weight, of the dish detergent use system. More preferably the metal sequestration composition comprises approximately 15%-25%, by weight, of the dish detergent use system. In one preferred implementation, sodium carbonate comprises approximately 35%-45%, by weight; poloxamer 181 comprises 0-10%, by weight; sodium metasilicate comprises 5%-15%, by weight; sodium percarbonate comprises 10%-20%, by weight; acusol comprises 0%-5%, by weight; and sodium chloride comprises 5%-15%, by weight; of the detergent use system.

In a second variation dish detergent use system, the system may include: a metal sequestration composition, comprising a galactarate compound that is comprised of sodium galactarate and an oxyanion that is comprised of a sodium borate mix salt. Additionally, the system may include: sodium carbonate, poloxamer 181, sodium metasilicate, sodium percarbonate, acusol 445, tetraacetylethylenediamine (TAED), sodium citrate, water, and citrus oil. The metal sequestration composition may comprise approximately 10-40%, by weight, of the dish detergent use system. More preferably the metal sequestration composition comprises approximately 20%-30%, by weight, of the dish detergent use system. In one preferred implementation, sodium carbonate comprises approximately 20%-30%, by weight; poloxamer 181 comprises 0-10%, by weight; sodium metasilicate comprises 5%-15%, by weight; sodium percarbonate comprises 15%-25%, by weight; acusol comprises 0%-5%, by weight; TAED comprises 0%-5%, by weight; sodium citrate comprises 0%-10%, by weight; water comprises 0%-10%, by weight, and citrus oil comprises 0%-5%, by weight; of the detergent use system.

Example 5—Hard Surface Cleaner

In a detergent use system, the metal sequestration composition may be further implemented to leverage the composition to enable a detergent for hard-surface cleaning, such as ceramic tiles. In some variations, the metal sequestration composition may comprise the first composition from example 1. Alternatively, the metal sequestration composition may comprise the second composition from example 2. The metal sequestration composition may comprise 2%-10%, by weight, of the detergent use system. The detergent use system for hard-surface cleaning may further comprise an alkyl polyglycoside surfactant (e.g., Glucopon 425, or Glucopon 325), glycol ether, sodium carbonate, citrus oil and water. In one preferred variation, alkyl polyglycoside surfactant is Caprylyl Glucoside and comprises, 0.4%-3%, by weight; glycol ether comprises 2%-10%, by weight, sodium carbonate comprises 0.1%-1%, citrus oil comprises 0.1-1.5%, and water comprises 75%-95% of the detergent use system.

In an alternative detergent use system, the system may be implemented as scouring powder for hard-surface cleaning. The scouring powder use detergent may function as an abrasive powder used to scrub surfaces. Examples of abrasive powder include: feldspar, calcite, emery, sand, diamond dust (e.g., synthetic), novaculite, pumice, iron(III) oxide, corundum, garnet, sandstone, rotten stone, staurolite, borazon, ceramic, ceramic aluminum oxide, ceramic iron oxide, corundum, dry ice, glass powder, stell abrasive, silicon carbide, zirconia alumina, boron carbide, slags, etc. In this variation, the metal sequestrant composition may comprise the first composition from example 1 that includes galactaric acid and sodium galactarate. Alternatively, the metal sequestrant composition may be any other desired composition or mix. Preferably, the metal sequestrant composition comprises 3%-20% of the scouring powder detergent use system. The scouring powder detergent use system may further comprise abrasive powder (e.g., ground glass, feldspar) and sodium alkylbenzenesulfonate. In one implementation, abrasive powder comprises 75%-95%, by weight; and sodium alkylbenzenesulfonate comprises 0%-10%, by weight, of the scouring powder detergent.

4. Method

A method for forming a cleaning composition includes combining a galactarate compound, a metalloid oxyanion, and an alkali source compound. The method functions in creating a cleaning composition that can then be used to remove and/or reduce soils. In some variations, the method further comprises preparing the galactarate compound.

As the method may be used to prepare cleaning compositions that can be highly specialized (or general) for the cleaning of specific soils, the method may vary component types and concentrations as deemed necessary. The metalloid oxyanion is preferably selected from a group consisting of: sodium aluminate, the conjugate acid of sodium aluminate, sodium borate, and the conjugate acid of sodium borate. Additionally or alternatively, other metalloid oxyanions and/or non-metalloid oxyanions may be used. The alkali source compound is preferably selected from a group consisting of: sodium hydroxide or sodium carbonate. Additionally or alternatively, other alkali source compounds may be used.

In some variations, the cleaning composition may have more, or fewer, components that need to be combined. For example, in some variations an alkali source compound is not required. In another example, for a dishwasher detergent, the method may additionally include combining other functional compounds (e.g., surfactants, fragrances, solvents, etc.).

In some variations, the method may further include preparing the galactarate compound. Dependent on the implementation, the galactarate compound may vary. Examples of galactarate compounds include: galactaric acid and sodium galactarate.

Combining a galactarate compound, a metalloid oxyanion, and an alkali source compound is preferably implementation specific and dependent on the desired final end product, and the end product properties (e.g., pH, solubility). In one variation, the galactarate compound is aluminum galactarate. The aluminum galactarate may be made by reacting the appropriate alkali metal salt (e.g., Li, Na, K, Rb, Cs) of the galactarate or the free galactaric acid with an aluminum salt or aluminate ("aluminum salt") dissolved with an alkali metal hydroxide. Examples of suitable aluminum salts dissolved with an alkali metal hydroxide include, but are not limited to, sodium aluminate and aluminum chloride. In one example, the molar ratio of the alkali metal salt of the galactarate or the free galactaric acid to aluminum salt dissolved with are alkali metal hydroxide is at least about 1:1. In another example, the molar ratio of the alkali metal salt of the galactarate or the free galactaric acid to aluminum salt dissolved with an alkali metal hydroxide is about 1:1.

Salt mixtures of galactaric acid were prepared to the desired composition by mixing sodium galactarate with either sodium borate decahydrate or sodium aluminate to a final weight of 10 grams. The weight ratios used for different compositions are shown in Table 2. In an alternative preparation, galactaric acid was mixed with either sodium borate decahydrate or sodium aluminate. The resulting mixture was dissolved in a stoichiometric solution of sodium hydroxide.

TABLE 2

Calcium sequestration of galactaric acid salt mixtures

| Oxyanion salt | % sodium galactarate | % oxyanion salt | mg $Ca^{2+}$/ g mixture |
|---|---|---|---|
| None | 100 | 0 | 5 |
| Sodium borate hydrate | 35 | 65 | 81 |
| Sodium borate hydrate | 41 | 59 | 86 |
| Sodium borate hydrate | 46 | 54 | 57 |
| Sodium borate hydrate | 50 | 50 | 88 |
| Sodium borate hydrate | 56 | 44 | 74 |
| Sodium borate hydrate | 61 | 39 | 74 |
| Sodium aluminate | 33 | 67 | 86 |
| Sodium aluminate | 41 | 59 | 114 |
| Sodium aluminate | 52 | 48 | 126 |
| Sodium aluminate | 61 | 39 | 150 |
| Sodium aluminate | 67 | 33 | 129 |
| Sodium aluminate | 73 | 27 | 113 |
| Sodium aluminate | 80 | 20 | 108 |

The efficacy of different mixtures of galactaric acid salts and oxyanion salts in sequestering calcium at 20° C. were tested. First, salt mixtures were dissolved in deionized water at 5 g/L. Sodium oxalate stock solution, prepared at 20 g/L and pH 10, was then added to the mixture solution to yield a final concentration of 1 g/L sodium oxalate. The pH was adjusted to 10 for mixtures containing borate as the oxyanion and to 11 for mixtures containing aluminate as the oxyanion with 1M sodium hydroxide or 1M hydrochloric acid. The resulting solutions were aliquoted to 50 mL and slowly titrated with stirring by addition of a 15 g/L anhydrous calcium chloride solution at a rate of 1 mL every 3 minutes until slight turbidity was observed, indicating saturation of calcium by the chelant mixture.

The results for the sequestration test with varying concentrations of oxyanion salt are shown in Table 2. These results demonstrate that these mixtures result in effective calcium sequestration over a broad range of compositions.

The effect of pH on calcium sequestration by mixtures of galactaric acid salts and oxyanion salts at room temperature was assayed. Mixtures of 70% disodium galactarate and 30% sodium aluminate and 60% disodium galactarate and 40% sodium borate decahydrate were prepared. The resulting mixtures were dissolved in deionized water at 5 g/L and the calcium sequestering capacity was determined, as described above, with the exception that the pH was adjusted to the indicated pH with either 1M sodium hydroxide or 1M hydrochloric acid.

As shown in Table 3, both mixtures performed well under alkaline conditions. The aluminate mixture showed higher sequestration under increasing alkalinity, while the borogalactarate mixture showed highest calcium sequestration near pH 10.

TABLE 3

The effect of pH on calcium sequestration by galactaric acid mixtures

| Oxyanion salt | pH | mg $Ca^{2+}$ /g mixture |
|---|---|---|
| Sodium borate hydrate | 8 | 13 |
| Sodium borate hydrate | 9 | 39 |
| Sodium borate hydrate | 9.5 | 52 |
| Sodium borate hydrate | 10 | 74 |
| Sodium borate hydrate | 10.5 | 78 |
| Sodium borate hydrate | 11 | 69 |
| Sodium borate hydrate | 11.5 | 69 |
| Sodium aluminate | 10.5 | 68 |
| Sodium aluminate | 11 | 108 |
| Sodium aluminate | 11.5 | 129 |

The calcium chelating capacity of a variety of standard compounds and mixtures was determined for 5 g/L solutions dissolved in water, as described above. In all instances the temperature was 20° C. and except where noted, the pH of solution was adjusted to 10 before determination. As shown in Table 4, galactaric acid salt containing mixtures bound more calcium than fully biobased trisodium citrate. Compared to leading chemicals used for calcium binding in water treatment applications such as GLDA (N,N-Dicarboxymethyl glutamic acid tetrasodium salt) and EDTA (Ethylenedinitrilo Tetraacetic Acid Disodium Salt Dihydrate), the galactaric acid salt mixtures bound similar amounts of calcium on a gram-for-gram basis.

TABLE 4

Calcium sequestration capacity for various chemicals

| Sequestering agent | mg $Ca^{2+}$ /g mixture |
|---|---|
| Trisodium citrate | 32 |
| EDTA | 104 |
| GLDA | 80 |
| GLDA (pH 11) | 132 |
| 70% sodium potassium glucarate / 30% sodium aluminate | 38 |
| 70% sodium potassium glucarate / 30% sodium aluminate (pH 11) | 70 |
| 70% sodium galactarate / 30% sodium aluminate | 38 |
| 70% sodium galactarate / 30% sodium aluminate (pH 11) | 108 |
| 60% sodium galactarate / 40% sodium borate hydrate | 90 |

TABLE 5

Iron(III) dispersion of various compounds

| Sequestering agent | mg $Fe^{2+}$ /g compound |
|---|---|
| 70% sodium galactarate/ 30% sodium aluminate | 865 |
| 60% sodium galactarate/ 40% sodium borate | 755 |
| 70% sodium potassium glucarate/ 30% sodium aluminate | 450 |
| EDTA | 240 |
| GLDA | 255 |

Compounds and compound mixtures were compared for their efficacy in preventing the precipitation of iron(III) hydroxide. Deionized water was used to prepare all solutions and all experiments were run at 20° C. Stock solutions of 20 g/L Fe2(SO4)3 and 1.0M sodium hydroxide were prepared. Test solutions were prepared by dissolving 1-5 g/L of the compound or compound mixture of interest in water and adjusting the pH to 8 by the addition of 1M sodium hydroxide or 1M hydrochloric acid.

A dilution series of iron was made from 4 mL aliquots of each test solution by adding between 0.1 and 1 mL of iron stock solution and water to bring the total volume to 5 mL These solutions were incubated for 5 minutes. Next, the pH of each iron-chelant solution in the dilution series was adjusted to 11 by the dropwise addition of the stock sodium hydroxide solution with mixing. The solutions were then incubated 10 minutes before centrifugation for 2 minutes at 4000×g. After centrifugation, the extent of iron dispersion was determined by the highest concentration of iron added within a dilution series that didn't yield any pellet of iron(III) hydroxide.

Using the testing method described above, the iron dispersion for sodium galactarate, a compound mixture containing sodium galactarate with oxyanion salts, and compounds known to the art were determined (Table 5). For compounds EDTA and GLDA, the test solutions were prepared at 5 g/L For sodium potassium glucarate and all galactarate-containing mixtures, solutions were prepared at 1.5 g/L The galactarate-containing mixtures were prepared as described above. Surprisingly, sodium galactarate mixtures demonstrated exceptionally high dispersion of iron(III) hydroxide. It was twice as effective as glucarate despite the only difference being stereochemical.

In one embodiment of this invention, the cleaning composition is an automatic dishwashing detergent. The auto-dishwashing detergent may include combining additional components upon an initial cleaning borogalactarate composition as a builder in an auto-dishwashing detergent mixture. The 60% disodium galactarate and 40% sodium borate decahydrate mixture was prepared. This borogalactarate mixture was used as the builder component for an automatic dishwashing composition described in Table 5. To form automatic dishwashing tablets for testing, 100 g of the solid components were mixed with mortar and pestle. To this mixture, 4 g of Poloxamer 181 and 20 g of deionized water were added to form a paste. The paste was then aliquoted into 24 g samples and allowed to set by drying at room temperature for 24 hours.

TABLE 6

Automatic dishwashing detergent composition

| Detergent component | Concentration (wt %) |
|---|---|
| Sodium carbonate | 40 |
| Sodium metasilicate | 10 |
| Accusol 445 | 1 |
| Builder | 20 |
| Sodium chloride | 10 |
| Poloxamer 181 | 4 |
| Sodium percarbonate | 15 |

Figure 2:
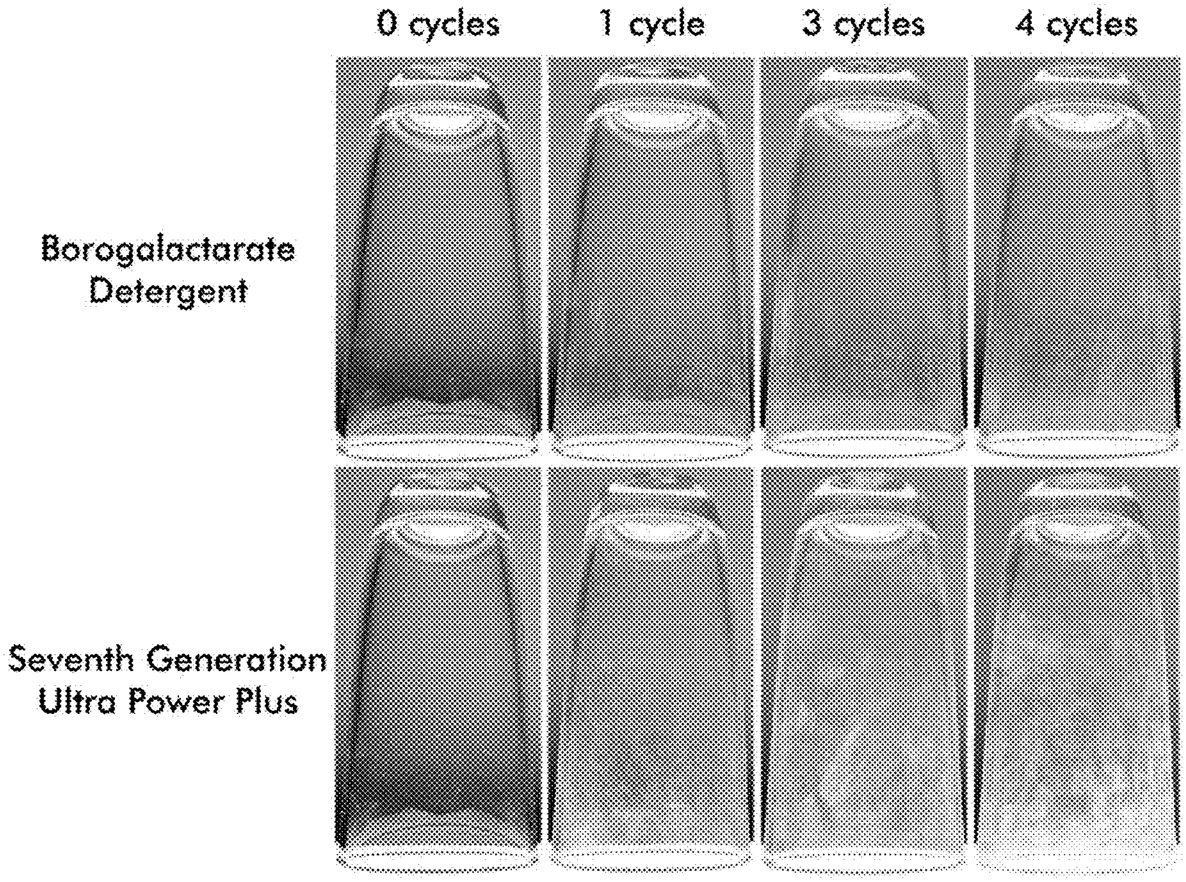
FIG. 2 is a comparison image of one application of the system and method.

The automatic dishwashing detergent was compared with sodium citrate-based Seventh Generation Ultra Power Plus™ tablets in buildup of spots and film on glassware during use in a home automatic dishwasher. The testing was performed in accordance with ASTM Method D 3556. A Kenmore 17152K dishwasher was evenly loaded with 10 cleaned Libbey Collins high ball glasses, 6 plates soiled with a combined 40 g of a 80% margarine, 20% non-fat powdered milk mixture evenly spread over the 6 plates and a 18-piece set of stainless steel cutlery. The dishwasher was loaded with either tablet and run through four wash cycles with Pasco County Florida tap water as feed (water hardness 240 ppm). Repeated cycles were run with fresh soil and detergent tablets, taking one glass out per cycle for comparison. After four dishwashing cycles, the glasses were compared by illuminating with a light box. As shown in FIG. 2, the automatic dishwashing detergent from Table 6 resulted in less spotting and filming compared to Seventh Generation Ultra Power Plus™ tablets, indicating the potential for these metal-sequestering compositions efficacious use in automatic dishwashing detergent.

As used herein, first, second, third, etc. are used to characterize and distinguish various elements, components, regions, layers and/or sections. These elements, components, regions, layers and/or sections should not be limited by these terms. Use of numerical terms may be used to distinguish one element, component, region, layer and/or section from another element, component, region, layer and/or section. Use of such numerical terms does not imply a sequence or order unless clearly indicated by the context. Such numerical references may be used interchangeable without departing from the teaching of the embodiments and variations herein.

As a person skilled in the art will recognize from the previous detailed description and from the figures and claims, modifications and changes can be made to the embodiments of the invention without departing from the scope of this invention as defined in the following claims.

We claim:

1. A cleaning and/or water treatment composition comprising:
- metal sequestration composition comprising:
  - a galactaric compound selected from a group consisting of a galactaric acid and a galactarate salt compound, comprising 35%-95%, by weight, of the metal sequestration composition,
  - an aluminum oxyanion comprising 5%-50%, by weight, of the metal sequestration composition, and
  - an alkali source compound selected from a hydroxide salt compound or a carbonate salt compound, comprising 5-40%, by weight, of metal sequestration composition.

2. The cleaning and/or water treatment composition of claim 1, wherein the aluminum oxyanion is selected from the group consisting of an aluminum salt compound and its conjugate acid, and the alkali source compound comprises a hydroxide salt compound.

3. The cleaning and/or water treatment composition of claim 2, wherein the galactarate compound comprises sodium galactarate, and the aluminum salt compound comprises sodium aluminate.

4. The cleaning and/or water treatment composition of claim 2, wherein the galactarate compound comprises galactaric acid, the aluminum salt compound comprises sodium aluminate, and the hydroxide salt compound comprises sodium hydroxide.

5. The cleaning and/or water treatment composition of claim 4, wherein the galactaric compound comprises 35%-70%, by weight, of the metal sequestration composition; the aluminum salt compound comprises 5%-40%, by weight, of the metal sequestration composition; and the hydroxide salt compound comprises 15%-35%, by weight, of the metal sequestration composition.

6. The cleaning and/or water treatment composition of claim 5, wherein the galactaric compound comprises 50%-60%, by weight, of the metal sequestration composition; the aluminum salt compound comprises 20%-30%, by weight, of the metal sequestration composition; and the hydroxide salt compound comprises 20%-30%, by weight, of the metal sequestration composition.

7. The cleaning and/or water treatment composition of claim 2, wherein the composition further comprises a bleaching agent comprising less than 30%, by weight, of the cleaning and/or water treatment composition.

8. A cleaning and/or water treatment composition comprising:
- metal sequestration composition comprising:
  - a galactaric compound selected from a group consisting of a galactaric acid and a galactarate salt compound, comprising 25%-95%, by weight, of the metal sequestration composition,
  - a borate oxyanion, comprising 5-75%, by weight, of the metal sequestration composition; and
  - an alkali source compound selected from a hydroxide salt compound or a carbonate salt compound, comprising 5-30%, by weight, of the metal sequestration composition.

9. The cleaning and/or water treatment composition of claim 8, wherein the borate oxyanion is selected from a group consisting of a borate salt compound and its conjugate acid and the alkali source comprises a hydroxide salt compound.

10. The cleaning and/or water treatment composition of claim 9, wherein the galactarate compound comprises sodium galactarate, and the borate salt compound comprises sodium borate salt.

11. The cleaning and/or water treatment composition of claim 8, wherein the galactaric compound comprises galactaric acid, the borate salt compound comprises a sodium borate salt, and the hydroxide salt compound comprises sodium hydroxide.

12. The cleaning and/or water treatment composition of claim 11, wherein the galactaric compound comprises 25%-75%, by weight, of the metal sequestration composition; the borate salt compound comprises 5%-65%, by weight, of the metal sequestration composition; and the hydroxide salt compound comprises 10%-30%, by weight, of the metal sequestration composition.

13. The cleaning and/or water treatment composition of claim 11, wherein the galactaric compound comprises 43%-53%, by weight, of the metal sequestration composition; the borate salt compound comprises 26%-36%, by weight, of the metal sequestration composition; and the hydroxide salt compound comprises 16%-26%, by weight, of the metal sequestration composition.

14. The cleaning and/or water treatment composition of claim 8, wherein the borate salt compound comprises a sodium borate mix and the carbonate salt compound comprises sodium carbonate.

15. The cleaning and/or water treatment composition of claim 14, wherein the cleaning and/or water treatment further comprises a metasilicate salt and a percarbonate salt.

16. The composition of claim 8, wherein the cleaning and/or water treatment further comprises a bleaching agent comprising less than 30%, by weight, of the cleaning and/or water treatment.

17. A cleaning and/or water treatment composition comprising:
- a metal sequestration composition comprising:
  - a galactaric compound selected from a group consisting of a galactaric acid and a galactarate salt compound comprising 40%-80%, by weight, of the metal sequestration composition, and an alkali source compound selected from a hydroxide salt compound or a carbonate salt compound comprising 20%-60%, by weight, of the metal sequestration composition.

18. The cleaning and/or water treatment composition of claim 17, wherein the alkali source compound is selected from the group consisting of sodium hydroxide and sodium carbonate.

19. The cleaning and/or water treatment composition of claim 18, wherein the galactaric compound comprises galactaric acid and the alkali source compound comprises sodium hydroxide.

20. The cleaning and/or water treatment composition of claim 19, wherein the galactaric compound comprises 60%-70%, by weight, of the metal sequestration composition; and the alkali source compound comprises 30%-40%, by weight, of the metal sequestration composition.

21. The cleaning and/or water treatment composition of claim 18, wherein the galactaric compound comprises galactaric acid, and the alkali source compound is sodium carbonate.

22. The cleaning and/or water treatment composition of claim 21, wherein the galactaric compound comprises 40%-50%, by weight, of the metal sequestration composition; and the alkali compound comprises 50%-60%, by weight, of the metal sequestration composition.

23. The cleaning and/or water treatment composition of claim 17, wherein the cleaning and/or water treatment further comprises a bleaching agent comprising less than 30%, by weight, of the cleaning and/or water treatment.

24. A method for forming a cleaning and/or water treatment composition, comprising:

preparing a metal sequestration composition that is a combination of a galactarate compound, a metalloid oxyanion, and an alkali source compound selected from a hydroxide salt compound or a carbonate salt compound, wherein the galactarate compound is selected from a group comprising a galactaric acid and a galactarate salt compound, comprising 35%-95%, by weight, of the metal sequestration composition, wherein the metalloid oxyanion comprises 5%-50%, by weight, of the metal sequestration composition, and wherein the alkali source compound comprises 5-40%, by weight, of the metal sequestration composition; and adding the metal sequestration composition to the cleaning and/or water treatment composition.

25. The method of claim 24, wherein the metalloid oxyanion is selected from the group consisting of, sodium aluminate, the conjugate acid of sodium aluminate, sodium borate, and the conjugate acid of sodium borate.

26. The method of claim 25, wherein the alkali source compound is selected from the group consisting of: sodium hydroxide and sodium carbonate.

27. The method of claim 24, wherein the metal sequestration composition is 10-40%, by weight, of the cleaning and/or water treatment composition.

28. The method of claim 24, wherein the metal sequestration composition is 0.15-2%, by weight, of the cleaning and/or water treatment composition.

29. The method of claim 24, wherein the metal sequestration composition is 2-20%, by weight, of the cleaning and/or water treatment composition.

30. The composition of claim 1, wherein the metal sequestration composition is 10-40%, by weight, of the cleaning and/or water treatment composition.

31. The composition of claim 1, wherein the metal sequestration composition is 0.15%-2%, by weight, of the cleaning and/or water treatment composition.

32. The composition of claim 1, wherein the metal sequestration composition is 3%-20%, by weight, of the cleaning and/or water treatment composition.

33. The composition of claim 1, wherein the metal sequestration composition is 2%-10%, by weight, of the cleaning and/or water treatment composition.

34. The composition of claim 8, wherein the metal sequestration composition is 10-40%, by weight, of the cleaning and/or water treatment composition.

35. The composition of claim 8, wherein metal sequestration composition is 0.15%-2%, by weight, of the cleaning and/or water treatment composition.

36. The composition of claim 8, wherein the metal sequestration composition is 3%-20%, by weight, of the cleaning and/or water treatment composition.

37. The composition of claim 8, wherein the metal sequestration composition is 2%-10%, by weight, of the cleaning and/or water treatment composition.

* * * * *